April 13, 1943.  J. A. JOHNSON  2,316,590
PORTABLE APPARATUS FOR TREATING FLAX STRAW
Filed Oct. 28, 1940 4 Sheets-Sheet 1

INVENTOR
JOHN A. JOHNSON
By Paul, Paul & Moore
ATTORNEYS.

April 13, 1943.  J. A. JOHNSON  2,316,590
PORTABLE APPARATUS FOR TREATING FLAX STRAW
Filed Oct. 28, 1940  4 Sheets-Sheet 3
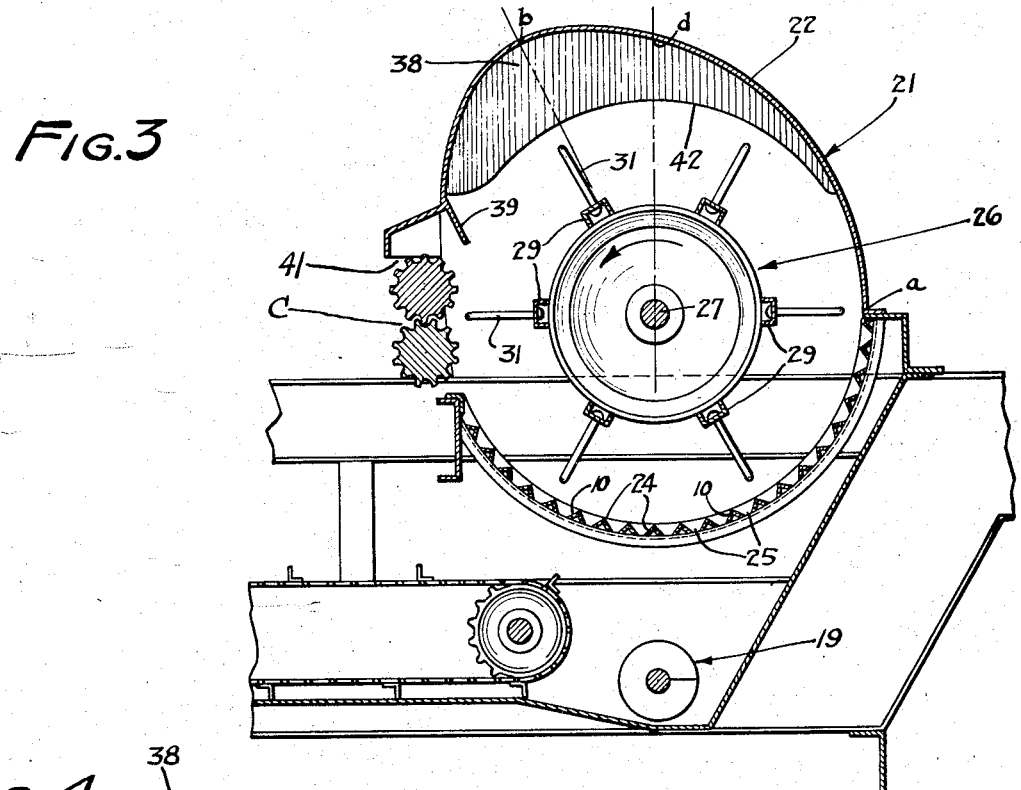
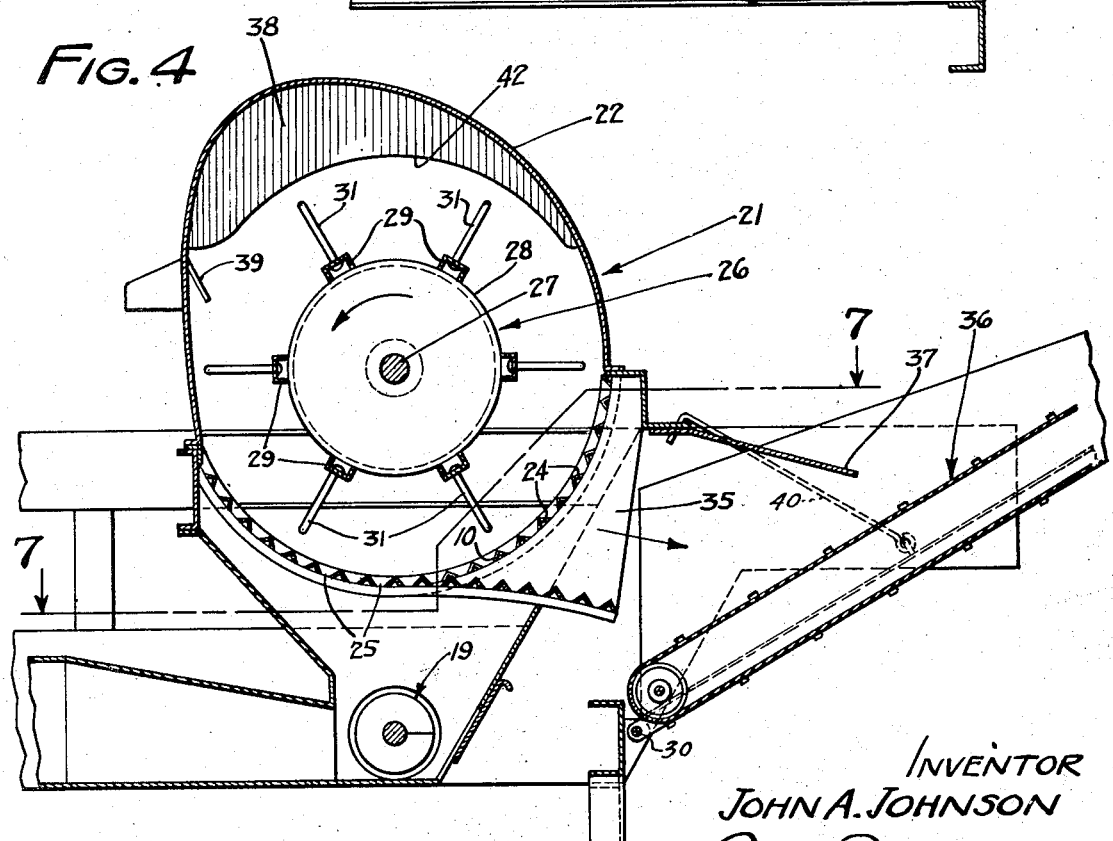
INVENTOR
JOHN A. JOHNSON
ATTORNEYS April 13, 1943. J. A. JOHNSON 2,316,590
PORTABLE APPARATUS FOR TREATING FLAX STRAW
Filed Oct. 28, 1940 4 Sheets-Sheet 4

INVENTOR
JOHN A. JOHNSON
By Paul, Paul & Moore
ATTORNEYS

Patented Apr. 13, 1943

2,316,590

UNITED STATES PATENT OFFICE 2,316,590

PORTABLE APPARATUS FOR TREATING FLAX STRAW

John A. Johnson, Winona, Minn.

Application October 28, 1940, Serial No. 363,116

9 Claims. (Cl. 19—90)

This invention relates to an improved apparatus for converting flax straw into a marketable product such as tow, fibers, etc., and more particularly to such an apparatus which may be operated directly in the field to recover a major portion of the fibrous materials.

It is well known that flax straw as obtained from the threshing of flax, has a valuable constituent, namely, its fiber. Numerous attempts have heretofore been made to utilize these fibers, but due to the expense of transportation and separation, it has not been economically attractive. In the past, the procedure has been to bale the flax straw in the field, after the threshing operation, whereby all of the foreign matter contained in the straw, such as foreign grain straws, weeds, weed seeds, dirt, dust, etc., is included in the bale. The baled straw is then shipped to a plant where the bales are broken and fed through a machine commonly known as a "break" comprising a series of corrugated rolls of different designs. A typical installation usually comprises three break machines connected in series and each machine comprising forty-eight break rolls, or one hundred and forty-four rolls in the completed installation. The straw, in passing through these corrugated break rolls, is subjected to a breaking and scutching action which decorticates and removes from the flax straw fibers, the woody portions of the straw, commonly known as shives. Other foreign grain and weed straws may pass along with the fibrous flax straw, as substantially no separation occurs in this operation. Flax straw, as it is produced in the field, may contain shives and foreign materials to the extent of 75 to 80 percent of the gross weight of the harvested flax straw. The foreign material normally contained in the harvested flax straw is of no value, and therefore when it is transported from the field intermixed with the fibrous flax straw, as is now customary, the cost of transporting the flax straw to the mill for treatment obviously is materially increased. Another objection to the transportation of flax straw to the mill in its normal threshed condition is that when the high percentage of shives and other waste materials are removed from the flax straw fibers at the mill, the disposition of the waste presents another problem. When the waste is removed from the fiber it becomes bulky and therefore tends to accumulate very rapidly, whereby a relatively large area is required for its storage and, as a result, frequent removal of the waste from the mill is usually necessary. Because of the waste having little or no value, the cost of transporting it from the mill again adds to the cost of manufacturing the fibrous material.

From the foregoing, it will thus be seen that a large percentage of the present cost of making flax fibers, as now commonly carried on, can be attributed directly to the cost of transporting the shives and other waste materials contained in the threshed flax straw to be treated, to and from the processing mill. It is therefore highly desirable that some means be provided whereby the major portion of the waste materials contained in threshed straw to be treated, such as shives, foreign grain straws, weeds, and weed seeds, may be removed from the relatively large, longer straw fibers directly in the field where the flax is harvested, whereby the cost of transporting such waste to and from the mill may be substantially entirely eliminated, with a corresponding reduction in the cost of converting the threshed straw into a marketable product, such as tow.

After considerable experimental work with various apparatus, in an attempt to devise some means for thus separating the waste from the straw fibers directly in the field, I finally succeeded in developing the portable apparatus herein disclosed. By the use of this portable apparatus, the major portions of the shive and other waste material contained in the flax straw, including foreign grain straws, weeds, etc., may be removed from the fibrous flax straw directly in the field, which heretofore has been considered impossible because of the inherent construction of conventional equipment. The novel apparatus herein disclosed has been found highly efficient and practical in actual operation in the field. It is very compact and relatively light in weight, whereby it may be readily transported from place to place, or from one field to another by means of an ordinary farm tractor or other suitable power unit. By thus removing the waste from the flax straw directly in the field, the waste may be left in the field, where it may be readily disposed of by burning, or in some other manner. Only the cleaned straw fibers, which usually is a small percentage of the bulk of the untreated flax straw in the field, need then be transported from the field to the mill.

An important object of the present invention, therefore, is to provide a portable apparatus for cleaning flax straw fibers, whereby the major portions of the usual shive and waste contained in the threshed flax straw may be removed therefrom directly in the field, whereby the expensive operation of transporting such waste to and from the mill, may be substantially entirely eliminated.

Another important object of the invention is to provide an apparatus of the class described which has the function of removing foreign straws from the flax straw in addition to the shive.

Another object is to provide an apparatus of the class described comprising a cleaning unit adapted to impart a scutching action to the flax straw to effect a separation of a large percentage of the usual shive and other foreign matter from the threshed flax straw, whereby the resultant straw is rendered well suited for the manufacture of higher quality products, such as tissue paper, etc.

A further object is to provide an apparatus for cleaning flax straw directly in the field, which is capable of removing the major portion of the shive and other foreign matter from the harvested flax straw, regardless of the condition of the flax straw, after which the cleaned flax straw may be baled in the field without the usual high percentage of waste, thereby rendering the flax transported to the mill of higher quality.

A further object is to provide a portable apparatus of the class described comprising a novel cleaning unit including a housing having a toothed cylinder or rotor mounted therein, and the upper portion of the housing being formed with an offset recess extending the length of the cylinder, and a plurality of spaced fins or vanes being secured to the upper wall of the housing and traversing said recess in such a manner that the material thrown into the recess by the centrifugal action of the cylinder is advanced toward a discharge opening provided at one end of the housing, said fins also cooperating to provide a plurality of closely spaced recesses in the upper portion of the housing, into which the straw is constantly being thrown from the cylinder teeth by centrifugal force, resulting in the straw constantly being turned over, as it is advanced lengthwise through the apparatus, and the bottom of the housing being composed of longitudinally extending closely spaced bars which cooperate with the cylinder to impart a scutching action to the straw, whereby the major portion of the shive is removed from the fibers and drops between said bars onto a suitable receiving means.

Other objects of the invention reside in the novel construction of the cleaning unit, which comprises a housing having a semi-cylindrical bottom formed with a plurality of longitudinally extending spaced-apart bars which cooperate to provide an open grid, said bars being V-shaped in cross-section and having their sloping sides or webs directed outwardly, whereby they cooperate to provide a plurality of longitudinally extending ridges or corrugations, and a toothed cylinder being mounted in the housing and cooperating with said corrugations to decorticate or break up the shive part of the straw, whereby the shive may more readily be removed from the flax straw fibers, and means being provided in the upper portion of the housing whereby the straw may be thrown out of contact with the cylinder teeth and turned over, thereby to cause all of the straw to be subjected to the scutching action imparted thereto as it is passed over the corrugated bottom surface of the housing by the rotary movement of the cylinder, whereby the major portion of the shive is removed from the flax straw fibers, as well as substantially all other foreign matter which may be contained therein; and, in the provision of a portable apparatus for cleaning flax straw, which is extremely simple and inexpensive in construction, and is of light weight, whereby it may readily and conveniently be transported from one place to another in the field by a suitable power unit.

A further object of the present invention is to provide an apparatus which is capable of producing a flax fiber which is substantially free from foreign straws. This is made possible as a result of the novel construction of the cleaning unit of the machine, wherein the flax straw and other material is subjected to a scutching action which is of such a nature as to decorticate and break up most of the shives, foreign straws and weeds contained in the threshed flax straw, but which does not break or damage the relatively long flax straw fibers, because of the inherent strength and toughness thereof, and whereby the fibers may readily be separated from such undesirable foreign matter, to produce a high quality, marketable fibrous stock or tow which may be used in the manufacture of high grade paper, textiles, etc.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 3 is an enlarged detail sectional view on the line 3—3 of Figure 5, showing the general construction of the cleaning unit of the machine;

Figure 4 is a detail view on the line 4—4 of Figure 5, showing the discharge opening of the cleaning unit;

Figure 1:
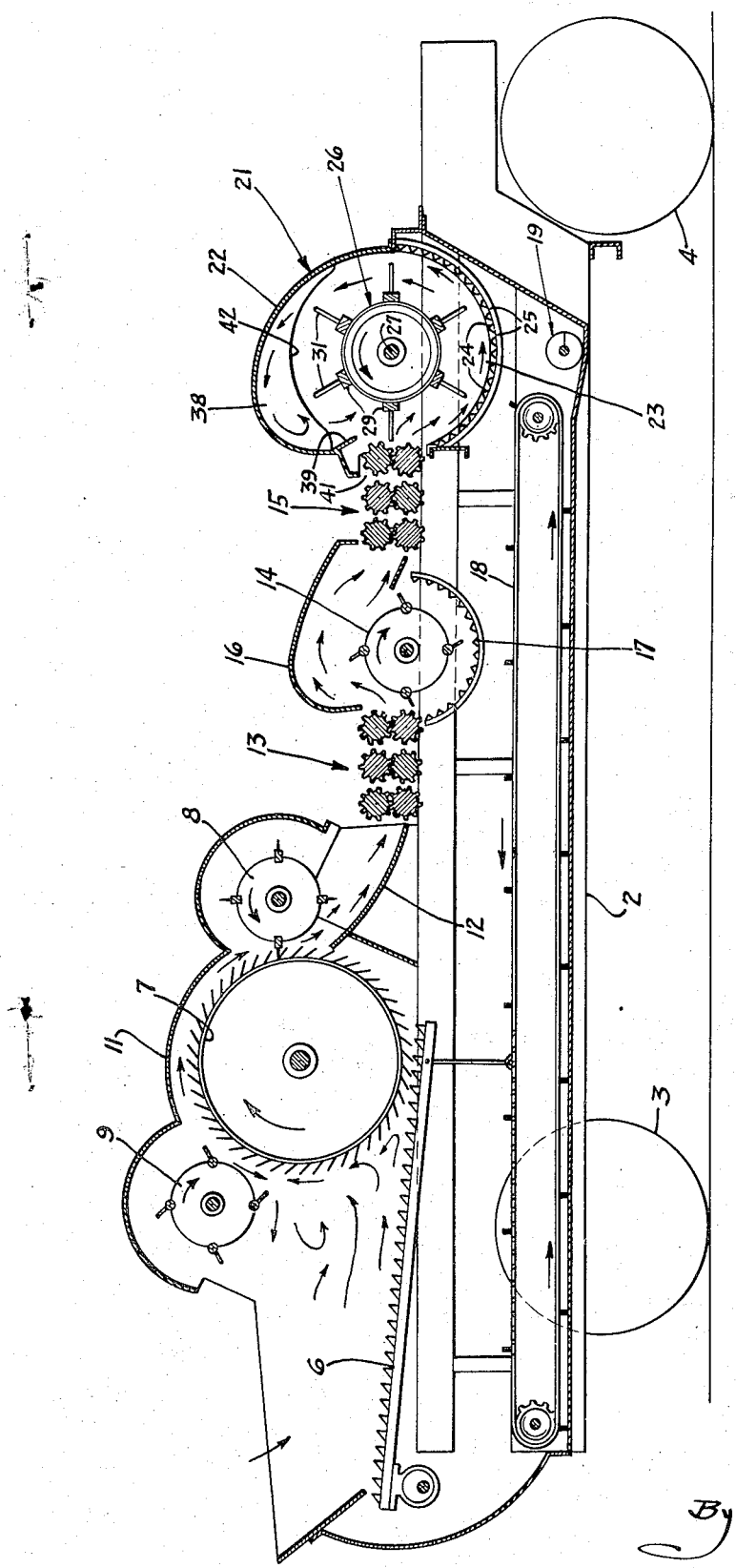
Figure 1 is a longitudinal sectional view showing the invention embodied in a portable machine for treating flax straw.

The portable flax straw treating and cleaning machine herein disclosed, is shown comprising a main supporting frame 2 mounted on suitable carrying wheels 3 and 4. The machine, when transported from one place to another, is propelled in the direction indicated by the arrow 5 in Figure 2, and the right hand end of the machine, as shown in this figure, will therefore be referred to as the front end of the machine.

The flax straw to be treated is delivered onto the straw racks 6 at the rear end of the machine, whereby it is fed forwardly to a main feed drum or pin cylinder, generally designated by the numeral 7. The toothed periphery of the feed drum 7 picks up the straw and conveys it to a stripping cylinder 8. A retarding doffer 9 coacts with the feed drum 7 to control the delivery of straw to the stripping cylinder 8, it being noted that, at point of contact between the two, the retarding doffer 9 rotates in a direction opposite to that of the feed drum 7, whereby portions of the straw may be thrown back onto the straw racks, as indicated by the arrows in Figure 1.

A suitable housing, generally designated by the numeral 11 is provided over the doffer 9, feed drum 7, and stripping cylinder 8, to confine the straw to the action of these parts. The stripping cylinder 8 delivers the straw onto an inclined bottom plate 12 which directs the straw and other material to the first set of corrugated break rolls, generally indicated by the numeral 13. From the break rolls 13, the material is delivered to a leveling doffer or cylinder 14, which again loosens up the straw and uniformly distributes it to a second set of break rolls 15. A suitable housing 16 encloses the upper portion of the leveling doffer or cylinder 14. A suitable grid 17 is provided beneath the cylinder 14, through which a portion of the waste material entrained with the flax straw may pass onto a suitable conveyer belt 18, shown extending substantially the length of the machine, from a point below the straw racks 6 to a point beyond the second set of break rolls 15.

The above described part of the machine is of more or less conventional construction, and operates to soften the flax straw and partially decorticate the shives thereof, and to uniformly feed the straw to a novel cleaning device, subsequently to be described. As the material travels from the straw racks 6 to the break rolls 15, portions of the shives and waste may be removed from the flax straw fibers and drop onto the conveyer 18, which conveys such material forwardly and discharges it into a screw conveyer, generally designated by the numeral 19.

An important feature of the present invention resides in the novel means provided at the front end of the machine for subjecting the flax straw to a scutching and cleaning action, whereby the major portion of the shives, foreign grain straws, weeds, and weed seeds, are removed from the flax straw fibers, after which the flax fibers are discharged from the machine onto a suitable receiving means, substantially free from shives, foreign grain straws, and other waste, which may have been contained in the threshed flax straw, as received from the field.

The novel means provided for thus cleaning the flax straw, is best shown in Figures 1 and 3 to 7, inclusive, and is in the form of a unitary structure, which will hereinafter be referred to as the cleaning unit, and is generally designated by the numeral 21 in the drawings. The cleaning unit 21 is shown comprising a housing including an upper section or hood 22 and a lower portion 23, which is substantially semi-cylindrical in form. The housing 21 of the cleaning unit is shown relatively longer in a direction crosswise of the machine than the actual width of the machine frame 2, and has one end extending beyond one side of the frame, as clearly illustrated in Figures 5, 6, and 7, for reasons subsequently to be described.

The lower semi-cylindrical bottom wall 23 of the housing is shown formed of longitudinally extending bars 24 which preferably are of angle iron cross section, as best shown in Figures 3 and 4.

The bars 24 are spaced apart to provide a plurality of longitudinal openings 25 therebetween, through which the waste material removed from the flax straw fibers may pass onto the conveyer belt 18 or directly into the screw conveyer 19. From actual operation of the machine in the field, I have found that best results are obtained when the angle iron bars 24 are arranged with their flanges or webs extending outwardly from the axis of the housing, whereby a plurality of closely spaced longitudinally extending ridges are formed, which provide in effect, a corrugated bottom wall surface over which the material delivered into the housing 21 is conveyed by a cylinder, generally indicated by the numeral 26, mounted within the housing 21. When the cylinder is rotated, the whirling action of the cylinder teeth and material engaged thereby creates a circulation of air within the housing. A portion of this air may pass from the housing through the grid openings 25, while a portion thereof is deflected inwardly as a result of its engagement with the inclined faces 10 of the inwardly facing V-shaped faces of the grid bars 24. The faces 10 of the grid bars 24 thus have a tendency to retard to some extent, air flow through the grid openings 25, whereby only the shives, decorticated foreign grain straws, weeds, and weed seeds, which are relatively smaller and more dense than the flax straw fibers, pass through the grid openings 25. It will thus be noted that the inwardly directed V-shaped faces of the grid bars 24 are important to effect maximum separation of the foreign matter from the flax straw fibers. The bars 24, however, need not necessarily be of angle iron cross-section, as obviously they may be square or triangular in cross-section, provided they are arranged with their V-shaped faces directed inwardly.

The cylinder 26 is shown comprising a shaft 27 having a plurality of suitable disk-like elements 28 mounted thereon in spaced relation lengthwise of the shaft. A plurality of longitudinally extending bars 29, preferably of channel cross-section, are suitably secured to the peripheries of the disk-like members 28, and support a plurality of radial teeth 31 which are adapted to engage the straw and convey it over the grid-like bottom of the housing, as will readily be understood by reference to Figure 1. The shaft 27 is supported in suitable bearings 32 and 33, shown secured to the supporting frame 34 of the housing of the cleaning unit.

Figures 5, 7:
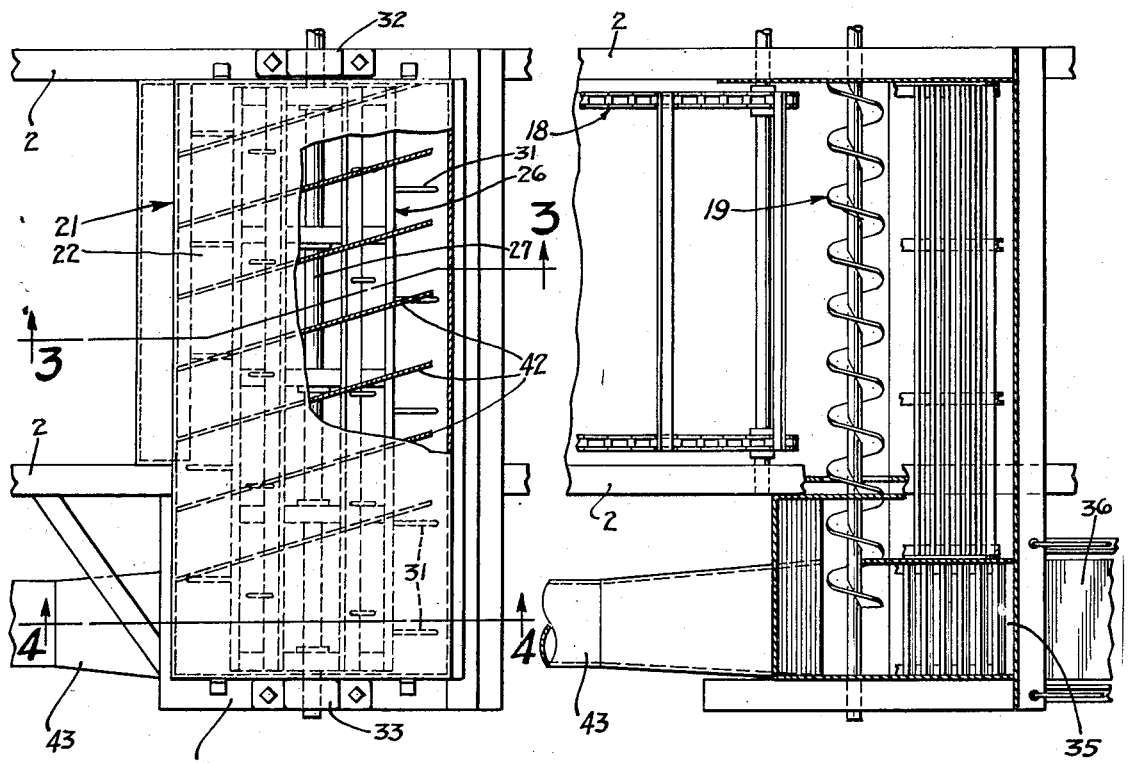
Figure 5 is a top view of the cleaning unit, partially broken away, to show the angular arrangement of the vanes in the upper portion thereof.
Figure 7 is a sectional plan view substantially on the line 7—7 of Figure 4.
Figure 6:
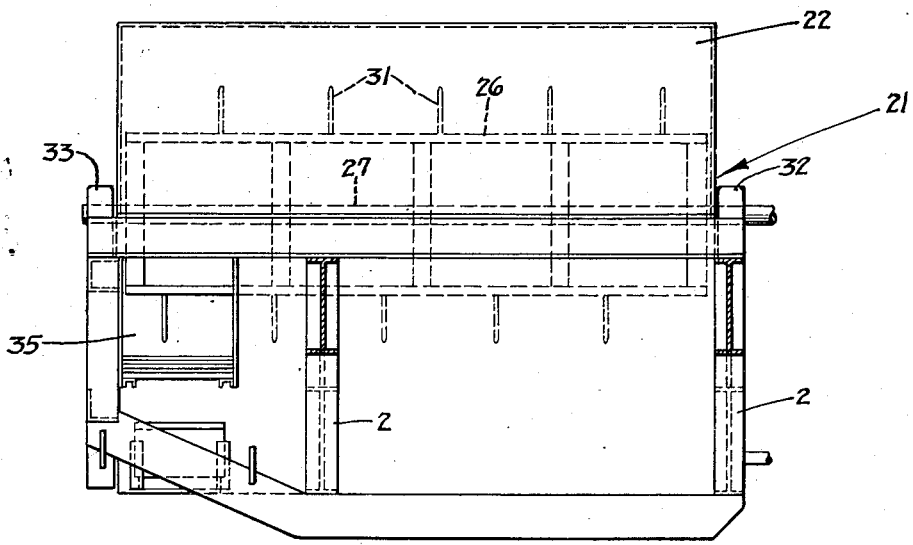
Figure 6 is a front view of the cleaning unit.

A fiber discharge opening 35 is provided at the overhanging end of the housing 21, as best shown in Figures 6 and 7, through which the cleaned straw fibers are discharged from the cleaning unit onto a suitable receiving means, such as a conveyer 36. The conveyer 36 may be of any well known construction applicable for the purpose, and is preferably detachably supported on the machine frame by such means as a pivot pin 30 and hook elements 40, shown in Figure 4. The conveyer 36 is adapted to convey the cleaned flax straw fibers to a suitable receiving means, not shown in the drawings. A deflector plate 37 is preferably provided over the discharge opening 35 to direct the fibers onto the conveyer 36, as will readily be understood by reference to Figure 4.

Another feature of the invention resides in the novel construction of the upper section or hood 22 of the housing. As best shown in Figures 3 and 4, the upper wall portion of the hood 22 is gradually outwardly curved or offset from the cylinder 26 to provide, in effect, a longitudinally extending recess or chamber 38, having its greatest depth offset from the vertical plane $d$ of the cylinder 26 in the direction of material travel in the hood 22. More specifically, the upper wall of the hood is gradually curved outwardly from point $a$ to the point of maximum distance from the axis of the cylinder 26, indicated at $b$ in Figure 3. From point $b$, said wall is curved inwardly and substantially meets the upper rear edge of the lower cylindrical wall of the housing at point $c$, on a line substantially tangent thereto. Point $b$ is located at an angle of approximately 25° from the vertical plane $d$ of the cylinder 26. It is to be understood that the angle between lines $b$ and $d$ may be somewhat varied without departing from the scope of the invention.

The particular shape of the wall of the hood, however, is of extreme importance in the operation of the cleaning unit, in that it must be so shaped that the material carried upwardly by the cylinder teeth 31, may be thrown into the recess or chamber 38 by centrifugal force, whereby it is turned over with respect to the cylinder. The straw or material thus thrown into the recess 38 is partially turned over because of the unique shape of the hood wall, and then drops by gravity into engagement with the cylinder teeth, whereby it is again passed over the corrugated bottom wall of the housing for further scutching action. It will thus be seen that the material is repeatedly being thrown clear of the cylinder teeth and picked up thereby, whereby all of the material delivered into the cleaning unit is subjected to the scutching action of the cylinder teeth and corrugated bottom wall of the housing.

A deflector plate 39 is preferably provided over the receiving opening 41 of the housing 21, to direct the straw thrown into the recess 38 inwardly into the path of the revolving cylinder teeth 31.

Another important feature of the invention resides in the provision of means in the upper portion of the hood 22 for advancing the material in a longitudinal direction within the housing 21, as the material is constantly being operated upon by the cylinder teeth 31. Such means is shown comprising a plurality of inclined vanes 42, secured to the upper, irregularly curved wall portion of the hood 22 in spaced parallel relation, as best shown in Figure 5. The vanes are so inclined with respect to the axis of the cylinder 26, that when engaged by the material thrown upwardly into the recess 38, they will cause the material to gradually advance in a direction towards the discharge opening 35 of the housing, as will best be understood by reference to Figure 5. The vanes thus cooperate to continually advance the material in a longitudinal direction in the housing until it eventually reaches the discharge opening 35 and is discharged from the housing onto the conveyer 36, by the centrifugal force of the rapidly rotating cylinder teeth 31.

The unique design and shape of the upper portion of the housing or hood 22 is important, as hereinbefore stated, in that it causes the material received in the recess or chamber 38, to be constantly turned over, whereby a new surface of the straw is continually being presented to the corrugated grid-like bottom of the housing. Because of the high peripheral speed of the cylinder teeth 31, the straw is held firmly in contact with the grid-like bottom of the housing, as it is conveyed thereover by said teeth, whereby a severe scutching action is obtained which decorticates and removes the major portions of the shives and other foreign matter from the straw fibers, before the fibers are ejected from the housing through the opening 35.

Figure 2:
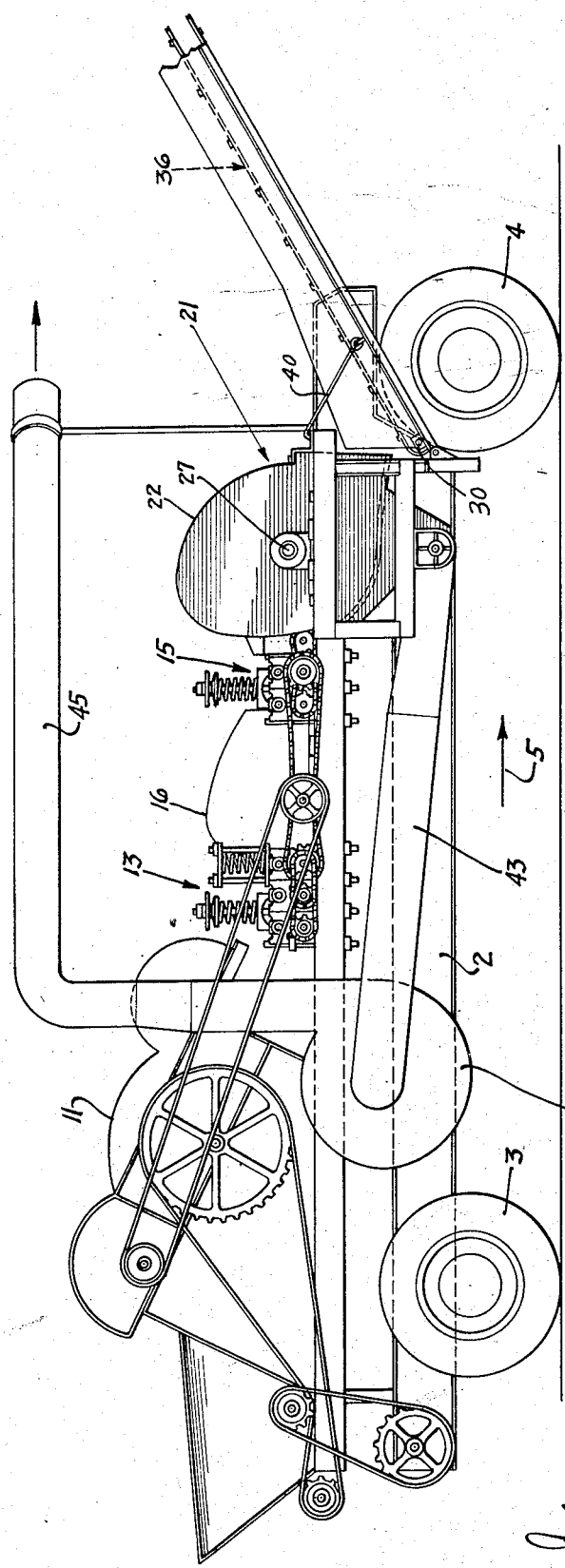
Figure 2 is a side elevation of the machine shown in Figure 1.

As shown in Figures 2, 5, and 7, one end of a suitable suction trunk 43 is connected to the discharge end of the screw conveyer 19 and has its opposite end connected to a suction fan, generally designated by the numeral 44. The discharge of the fan 44 is shown connected to a suitable conduit 45 having an upper horizontal portion from which the waste, such as shives, other foreign grain straws, weeds, weed seeds, and chaff, may be directed to a suitable receiving means, not shown. If desired, the waste material may be discharged directly on the ground from the conduit 45.

The novel machine herein disclosed, has been found extremely practical in the treatment of flax straw directly in the field, for the purpose of removing therefrom, the major portions of the waste usually contained in the threshed flax straw before treatment. The machine has been particularly designed for operation directly in the field, for the express purpose of removing from the more valuable flax straw fibers, the major portions of the waste usually contained in the flax straw, thereby eliminating the expensive operation of transporting such waste to a remote point, such as a tow mill, simultaneously with the threshed flax straw, as is now common practice. The various elements of the machine, as shown in Figures 1 and 2, are driven in timed relation by suitable belt and chain drives, which are more or less common and well known to the trade, and it is therefore thought unnecessary to herein describe them in detail. The same applies to the constructional details of the machine frame.

The outstanding feature of the invention, however, resides in the unique construction of the cleaning unit 21, per se, which makes it possible to effect a relatively thorough cleaning of the flax straw fibers directly in the field, which heretofore was considered impossible. By constructing the upper portion of the housing or hood 22 as best shown in Figures 3 and 4, and by the provision of the corrugated bottom wall of the housing, and moreover, because of the portability of the machine, a relatively thorough separation of the waste from the flax straw fibers directly in the field, is made possible, which heretofore has been considered impossible with conventional apparatus. Because of the longitudinally extending recess provided in the upper portion of the housing or hood 22, the flax straw and other material whirled around by the cylinder teeth 31, is constantly being thrown clear of the teeth by the centrifugal action of the rapidly rotating cylinder, resulting in the material being continually turned over and returned to the cylinder for further scutching action. This process continues throughout the length of the housing, the waste material being so reduced in size by the scutching action of the corrugated bottom of the housing and the cylinder teeth, as to readily pass through the openings between the bars 24, whereby only the cleaned flax straw fibers are discharged from the housing through the opening 35 onto the conveyer 36.

In actual operation, it has been found that the scutching action on the flax straw in the cleaning unit, does not tend to break or tear the flax straw fibers, but only the shives, foreign grain straws, and weeds, whereby a relatively thorough separation of the more valuable flax straw fibers from such waste, may readily be accomplished with this novel machine directly in the field.

I claim as my invention:

1. In a portable apparatus of the class described, a housing comprising a lower semi-cylindrical bottom wall constructed of a plurality of longitudinally extending spaced parallel bars which cooperate to provide a grid having a corrugated surface, an imperforate hood forming the upper portion of the housing, said housing having feed and discharge openings, a cylinder mounted in the housing and having a plurality of teeth adapted to engage the flax straw delivered to the housing and convey it over the corrugated bottom surface of the housing, whereby a scutching action is imparted to the straw, and the upper wall portion of the hood extending upwardly from the horizontal plane of the cylinder axis in an outwardly sweeping curve away from the cylinder, and in the direction of movement of the upper portion of the cylinder, to a point beyond the vertical plane of the cylinder axis, and thence downwardly in a direction towards the lower cylindrical wall portion of the housing in substantially a vertical line tangent to the lower housing wall, whereby a longitudinally extending recess or chamber is formed in the upper portion of the hood into which the straw is repeatedly thrown from the cylinder teeth and turned over with respect to the cylinder, whereby all of the straw delivered into the housing is subjected to the scutching action of the corrugations in the bottom wall of the housing.

2. In an apparatus of the class described, a housing comprising a lower semi-cylindrical bottom wall constructed of a plurality of longitudinally extending spaced parallel inverted V-shaped bars which cooperate to provide a grid having a corrugated surface, a hood forming the upper portion of the housing, said housing having a feed opening intermediate its ends and a discharge opening adjacent one end, a cylinder mounted in the housing and having a plurality of teeth adapted to engage the flax straw delivered to the housing and convey it over the corrugated bottom surface of the housing, whereby a scutching action is imparted to the straw, and the upper wall portion of the hood extending upwardly from the horizontal plane of the cylinder axis in an outwardly sweeping curve away from the cylinder, and in the direction of movement of the upper portion of the cylinder, to a point beyond the vertical plane of the cylinder axis, and thence downwardly in a direction towards the lower cylindrical wall portion of the housing in substantially a vertical line tangent to the lower housing wall, whereby a longitudinally extending recess or chamber is formed in the upper portion of the hood into which the straw is repeatedly thrown from the cylinder teeth and turned over with respect to the cylinder, whereby all of the straw delivered into the housing is subjected to the scutching action of the corrugations in the bottom wall of the housing.

3. In an apparatus of the class described, a housing comprising a lower semi-cylindrical bottom wall formed with longitudinally extending corrugations having openings therebetween for the passage of shive and foreign straws and weeds contained in the flax straw, means for feeding flax straw into the housing, a discharge opening adjacent one end of the housing, a cylinder in the housing having a plurality of teeth adapted to engage and convey the straw over the corrugations in the bottom of the housing in a direction crosswise thereof, whereby a scutching action is imparted to the straw which breaks up and removes the shive from the bast fibers of the straw, and the upper wall portion of the housing extending upwardly from the horizontal plane of the cylinder axis in an outwardly sweeping curve away from the cylinder, and in the direction of movement of the upper portion of the cylinder, to a point beyond the vertical plane of the cylinder axis, and thence downwardly in a direction towards the lower cylindrical wall portion of the housing in substantially a vertical line tangent to the lower housing wall, whereby a longitudinally extending recess or chamber is formed in the upper portion of the housing into which the straw is repeatedly thrown from the cylinder teeth and turned over with respect to the cylinder, whereby all of the straw is subjected to the scutching action of the corrugations in the bottom of the housing, as the straw is repeatedly conveyed thereover, thereby effecting a relatively thorough separation of the bast fibers of the straw from the shive and foreign straws and weeds contained in the straw before treatment.

4. In an apparatus of the class described, a wheeled frame, a housing mounted thereon and comprising a lower semi-cylindrical bottom wall formed with longitudinally extending corrugations having openings therebetween for the passage of shive and other foreign straws and weeds contained in the flax straw, means for feeding flax straw into the housing, a discharge opening adjacent one end of the housing, a cylinder in the housing having a plurality of teeth adapted to engage and convey the straw over the corrugations in the bottom of the housing in a direction crosswise thereof, whereby a scutching action is imparted to the straw to break up and remove the shive from the bast fibers of the straw, and the upper wall portion of the housing extending upwardly from the horizontal plane of the cylinder axis in an outwardly sweeping curve away from the cylinder, and in the direction of movement of the upper portion of the cylinder, to a point beyond the vertical plane of the cylinder axis, and thence downwardly in a direction towards the lower cylindrical wall portion of the housing in substantially a vertical line tangent to the lower housing wall, whereby a longitudinally extending recess or chamber is formed in the upper portion of the housing into which the straw is repeatedly thrown from the cylinder teeth and turned over with respect to the cylinder, whereby all of the straw is subjected to the sutching action of the corrugations in the bottom of the housing, as the straw is repeatedly conveyed thereover, thereby effecting a relatively thorough separation of the bast fibers of the straw from the shive and foreign straws and weeds contained in the straw before treatment, and a plurality of inclined vanes in said recess or chamber for advancing the material in a longitudinal direction in the housing.

5. In an apparatus of the class described, a housing comprising a lower semi-cylindrical bottom wall formed with longitudinally extending corrugations having openings therebetween for the passage of shive and foreign straws and weeds removed from the flax straw, means for feeding flax straw into the housing, a discharge opening adjacent one end of the housing, a cylinder in the housing having a plurality of teeth adapted to engage and convey the straw over the corrugations in the bottom of the housing in a direction cross-wise thereof, whereby a scutching action is imparted to the straw which breaks up and removes the shive from the bast fibers of the straw, and the upper wall portion of the housing extending upwardly from the horizontal plane of the cylinder axis in an outwardly sweeping curve away from the cylinder, and in the direction of movement of the upper portion of the cylinder, to a point beyond the vertical plane of the cylinder axis, and thence downwardly in a direction towards the lower cylindrical wall portion of the housing in substantially a vertical line tangent to the lower housing wall, whereby a longitudinally extending recess or chamber is formed in the upper portion of the housing into which the straw may be repeatedly thrown by the cylinder teeth and turned over with respect to the cylinder, whereby all of the straw is subjected to the scutching action of the corrugations in the bottom of the housing, as the straw is repeatedly conveyed thereover, and a plurality of angularly disposed vanes in said off-set recess for advancing the straw in an axial direction in the housing towards the discharge opening.

6. In an apparatus of the class described, a housing comprising a semi-cylindrical bottom wall formed with longitudinally extending corrugations, means for feeding flax straw into said housing, a discharge opening adjacent one end of the housing, a suitable cylinder mounted within said housing and provided with a plurality of teeth, and the upper wall portion of the housing extending upwardly from the horizontal plane of the cylinder axis in an outwardly sweeping curve away from the cylinder, and in the direction of movement of the upper portion of the cylinder, to a point beyond the vertical plane of the cylinder axis, and thence downwardly in a direction towards the lower cylindrical wall portion of the housing in substantially a vertical line tangent to the lower housing wall, whereby a longitudinally extending recess or chamber is formed in the upper portion of the housing into which the straw is repeatedly thrown from the cylinder teeth and turned over with respect to the cylinder, whereby all of the straw delivered into the housing is subjected to the scutching action of the corrugation in the bottom of the housing, as the straw is repeatedly conveyed thereover by the rotary movement of the cylinder and whereby a relatively thorough separation of the bast fibers of the straw from the shive and foreign straws and weeds is effected.

7. A housing comprising a lower semi-cylindrical grid-like bottom wall and an upper curved wall, a cylinder mounted in said housing, and said upper curved wall extending upwardly from the horizontal plane of the cylinder axis in an outwardly sweeping curve away from the cylinder, and in the direction of movement of the upper portion of the cylinder, to a point beyond the vertical plane of the cylinder axis, and thence downwardly in a direction towards the lower cylindrical wall portion of the housing in substantially a vertical line tangent to the lower housing wall, whereby a longitudinally extending recess or chamber is formed in the upper portion of the housing into which the material delivered into the housing is repeatedly thrown from the cylinder teeth and turned over with respect to the cylinder.

8. A housing comprising a lower semi-cylindrical grid-like bottom wall and an upper curved wall, said housing having an intake opening intermediate its ends and a discharge opening adjacent one end, a cylinder mounted in the housing, and said upper curved wall extending upwardly from the horizontal plane of the cylinder axis in an outwardly sweeping curve away from the cylinder, and in the direction of movement of the upper portion of the cylinder, to a point beyond the vertical plane of the cylinder axis, and thence downwardly in a direction towards the lower cylindrical wall portion of the housing in substantially a vertical line tangent to the lower housing wall, whereby a longitudinally extending recess or chamber is formed in the upper portion of the housing into which the material delivered into the housing is repeatedly thrown from the cylinder teeth and turned over with respect to the cylinder, and a plurality of inclined vanes in said recess arranged to be engaged by the material thrown into the recess by the cylinder teeth, whereby said vanes gradually advance it in a direction lengthwise of the housing, towards the discharge opening.

9. A housing comprising a lower semi-cylindrical grid-like bottom wall and an upper curved wall, said housing having an intake opening in a wall thereof, a discharge opening adjacent one end of the housing, a cylinder mounted in the housing, and said upper curved wall extending upwardly from the horizontal plane of the cylinder axis in an outwardly sweeping curve away from the cylinder, and in the direction of movement of the upper portion of the cylinder, to a point beyond the vertical plane of the cylinder axis, and thence downwardly in a direction towards the lower cylindrical wall portion of the housing in substantially a vertical line tangent to the lower housing wall, whereby a longitudinally extending recess or chamber is formed in the upper portion of the housing into which the material delivered into the housing is repeatedly thrown from the cylinder teeth and turned over with respect to the cylinder, and a plurality of vanes secured to said upper curved wall and disposed transversely thereof at an angle to the axis of the cylinder, and extending substantially from side to side of the housing over the cylinder, whereby the material thrown against said vanes by the cylinder teeth will be gradually advanced in a direction lengthwise of the housing towards the discharge opening.

JOHN A. JOHNSON.